ically joining the two halves of telescoping capsules made of a thermoplastic material such as a rigid gelatin, which process involves spraying a tackifying agent such as steam on one or both of the capsules and rotating them together.

United States Patent [19]

MacLaughlin et al.

[11] Patent Number: 4,581,875
[45] Date of Patent: Apr. 15, 1986

[54] PROCESS FOR FORMING TAMPER-RESISTANT TAMPER-INDICATIVE CAPSULES

[75] Inventors: Donald N. MacLaughlin, Midland, Mich.; Vincent E. Fortuna, Huntington Beach, Calif.

[73] Assignee: Cosden Technology, Inc., Dallas, Tex.

[21] Appl. No.: 506,134

[22] Filed: Jun. 20, 1983

[51] Int. Cl.[4] .................. B65B 51/22; B65B 51/02; B65B 7/28
[52] U.S. Cl. .................................. 53/467; 53/468; 53/471; 53/477; 53/478
[58] Field of Search .................. 53/471, 467, 454, 477, 53/478, 468, 487; 156/69, 294, 308.6, 308.4

[56] References Cited

U.S. PATENT DOCUMENTS

| Re. 29,448 | 10/1977 | Brown et al. | 156/294 X |
| 1,856,743 | 5/1932 | Brooks | 53/478 |
| 2,498,831 | 2/1950 | Veitch | 156/308.4 X |
| 2,748,005 | 5/1956 | Baier | 53/478 X |
| 2,760,551 | 8/1956 | Downey et al. | 53/478 X |
| 2,936,493 | 5/1960 | Scherer | 53/468 X |
| 3,475,243 | 10/1969 | Scalora | 53/478 X |
| 3,518,340 | 6/1970 | Raper | 53/471 X |
| 4,137,117 | 1/1979 | Jones | 156/308.6 X |
| 4,196,564 | 4/1980 | Bodenmann et al. | 53/471 |
| 4,196,565 | 4/1980 | Dodenmann et al. | 53/471 |
| 4,325,761 | 4/1982 | Pace | 53/478 X |
| 4,466,844 | 8/1984 | MacLaughlin et al. | 156/294 X |
| 4,514,242 | 4/1985 | MacLaughlin et al. | 156/294 X |

Primary Examiner—Horace M. Culver
Attorney, Agent, or Firm—Michael J. Caddell; M. Norwood Cheairs

[57] ABSTRACT

A process is disclosed for securely joining the two halves of telescoping capsules made of a thermoplastic material such as a rigid gelatin, which process involves spraying a tackifying agent such as steam on one or both of the capsules and rotating them together.

19 Claims, 10 Drawing Figures

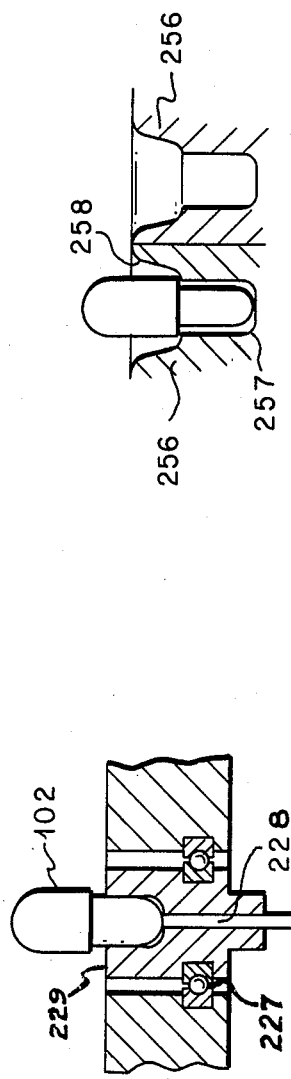
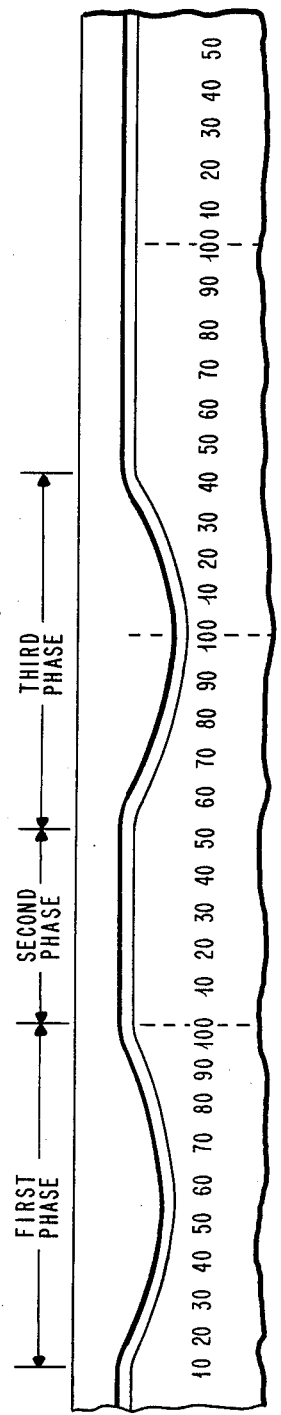

PROCESS FOR FORMING TAMPER-RESISTANT TAMPER-INDICATIVE CAPSULES

BACKGROUND OF THE INVENTION

The present invention relates generally to processes and apparatus for sealing medicinal capsules and more particularly involves methods and apparatus for spin-welding rigid gelatin capsule sections together to form sealed tamper-proof and tamper-indicative consumer items.

Conventional methods of packaging powdered consumer products such as aspirin, headache powders, and cold remedies involve the packaging of individual doses of these medicinal compounds into telescopic tubular capsules manufactured from "rigid gelatin". Each such capsule contains a single dose of the subject medicine and consists of a top tubular section which is slipped over in relatively snug-fitting engagement a bottom tubular capsule containing the medicinal compound. With these conventional capsules experience has shown that they are very susceptible to tampering by the general public while sitting on the retailer's shelves. Conventional means for preventing such tampering involves the use of elaborate closures for the medicine bottles. Unfortunately, most if not all of these so called tamper-indicative bottle closures can be defeated by ingenious persons. Even in the case where the bottle closures are difficult to defeat after the bottle has been opened its contents are still vulnerable to tampering by persons who have access to the bottle. For example, in public health clinics, school clinics and other areas where the public has general access to such medicines, the tamper-indicative bottle closures do little to prevent tampering with the capsules after the bottle has been opened.

The present invention overcomes these difficulties of the prior art means of preventing medicine tampering by providing methods and apparatus for sealing each individual medicine capsule. The seal achieved with each capsule is an integral seal sufficiently strong enough to require destruction of the capsule to expose the contents thereof. Such destruction is a clear indication to a subsequent user that the capsule has been tampered with.

SUMMARY OF THE INVENTION

The present invention describes means and processes for tightly sealing together telescopic ends of individual capsules containing powdered medicinal compounds. The process embodies a combination steam jet and spin-welding technique to provide rapid mass production sealing of individual capsules.

BRIEF DESCRIPTION OF THE DRAWINGS

FIG. 7 illustrates a close-up illustration of an alternate embodiment of a spin-welding station spin-welding station.

FIG. 8 illustrates a schematic view of the camming assembly of the spin-welding apparatus.

FIG. 9 illustrates a schematic view of the orienter assembly of the apparatus.

DESCRIPTION OF THE PREFERRED EMBODIMENTS

Figure 1:
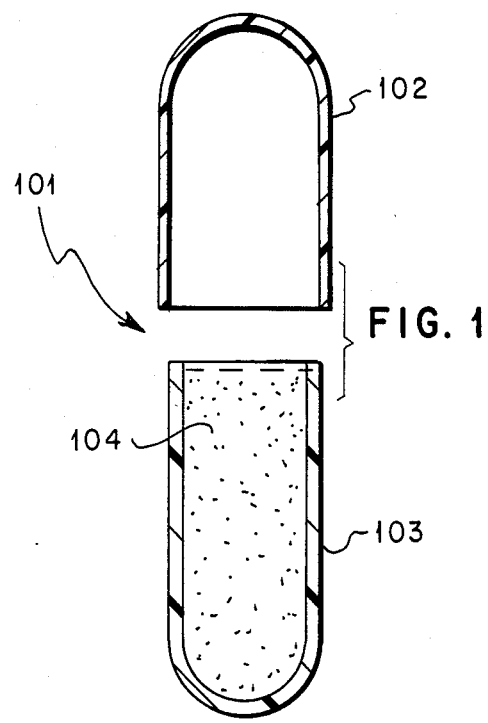
FIG. 1 is a side-elevational view of a set of capsule components prior to assembly.

Referring now to FIGS. 1 through 4 there are illustrated in enlarged cross-sectional detail the various stages of the telescoping capsule assembly. In FIG. 1 a gelatin capsule 101 comprises a top or upper cylinder 102, and the bottom or lower cylinder 103 which has been filled with a powdered medicinal compound 104. The particular capsule components 102 and 103 may be of the conventional type currently in use today. These capsules comprise a pair of generally cylindrical tubular capsule sections made in a cylindrical circular shape of a rigid gelatin and each having a rounded end. The two components generally are very close in size and feature a tight, friction fit therebetween. There is just enough clearance or tolerance in the sizes to allow a sliding movement between the cartridges after they have been filled with powder.

Figure 2:
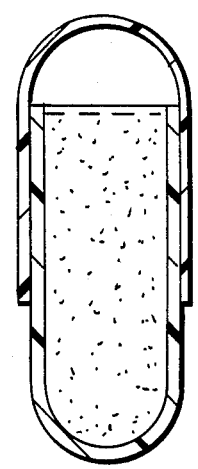
FIG. 2 illustrates a cross-sectional side view of an assembled capsule.

FIG. 2 illustrates a conventional cartridge after it has been completely telescoped into its closed position. This is the orientation of the capsule as it is placed into the apparatus of the present invention. In the present embodiment the invention is directed to an "after-market" or add-on type of system to be utilized with the capsule-fillers currently in use. In other words, the present invention in its disclosed embodiment is intended to be added to the end of a capsule filling line between the filling system and the bottling apparatus. In a separate embodiment it is visualized that the present invention could be integrated into a filling system and could thus reduce by one or two steps the practice of the present invention. Notwithstanding the aforementioned reference to an integrated system, the present embodiment will be described as an add-on system to be placed in line with a manufacturer's present equipment. Thus the process will be described in relation to the steps of taking a finished capsule as indicated in FIG. 2 and partially separating the capsule, then rejoining the capsule in a spin-welded mode. Thus FIG. 2 illustrates the capsules as they arrive at the apparatus described in this invention.

Figure 3:
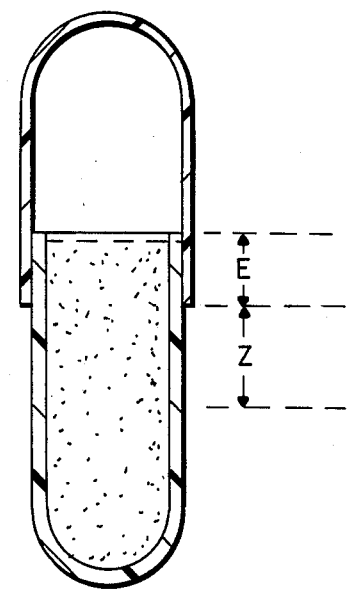
FIG. 3 illustrates a cross-sectional side view of a capsule which has been partially de-telescoped.
Figure 4:
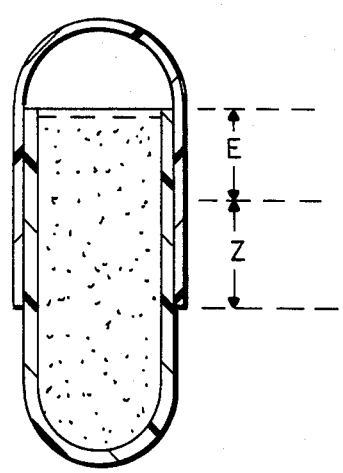
FIG. 4 illustrates a cross-sectional side view of a capsule that has been rejoined and sealed according to the present invention.

FIG. 3 shows a cross-sectional side view of the cartridge of FIG. 2 after it has been securely located in the spin-welding apparatus of this invention and has been separated by a distance denoted by "Z", the remaining telescopic engagement of the capsule components in FIG. 3 being signified by the symbol "E". The ratio of separation Z to engagement E during the spin-welding preliminary stage is approximately 3 to 2 or, put in another way, the capsule is de-telescoped approximately 60 percent of its original engagement dimension. While the capsule is held in the orientation of FIG. 3 the steps hereinafter more particularly described are performed on the capsule and it is re-engaged at a predetermined specific instant after being impinged with a thin steam jet, and spin-welded. FIG. 4 illustrates the reengagement of the capsule components immediately subsequent to the steam impingement and spin-welding steps. FIG. 4 therefore represents the final sealed configuration of the tamper-proof and tamper-indicative capsule.

Figure 5:
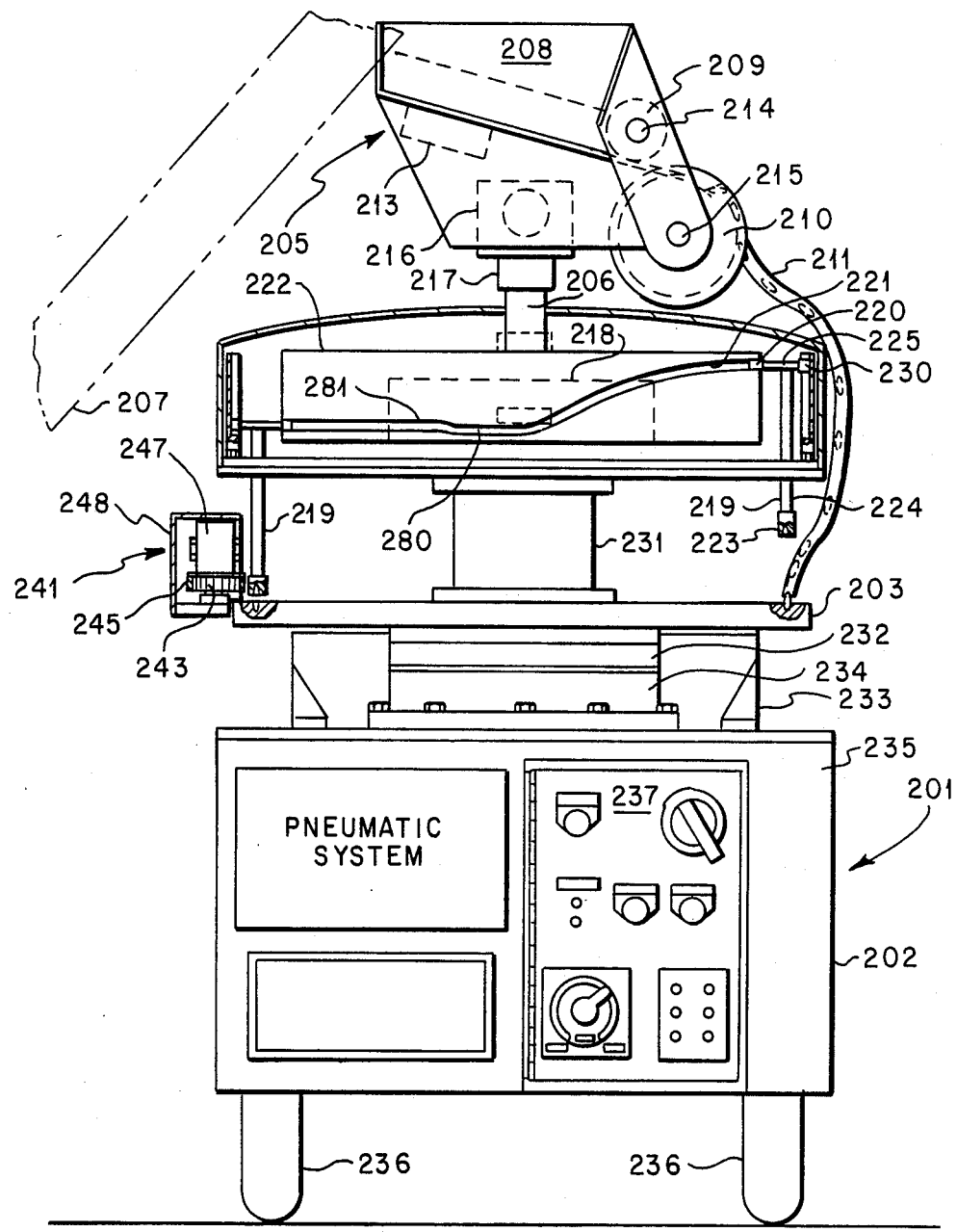
FIG. 5 illustrates a side elevational view of a capsule welding apparatus.
Figure 6:
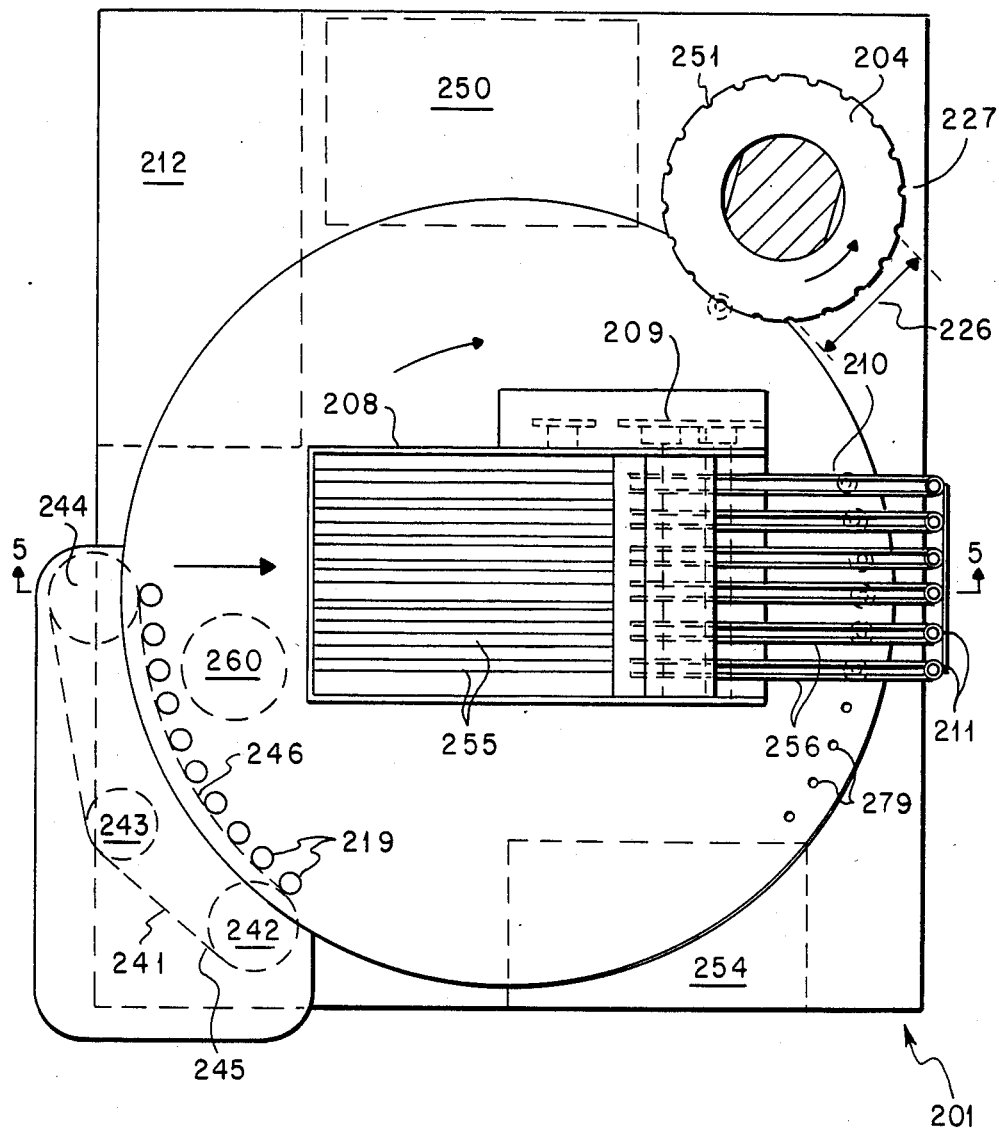
FIG. 6 illustrates a top view of the apparatus of FIG. 5.

Referring now to FIG. 5, one preferred embodiment of the a system for preforming the present invention is disclosed in schematic view therein. In FIG. 5 the basic system 201 comprises a base 202 upon which is rotatably mounted a welding wheel 203 and a pickup wheel 204 (FIG. 6). On a spindle above weld wheel 203 is located a feed system 205 comprising a mounting spindle 206, a ladder feeder (conveyor) 207, a bulk feed trough 208, a slow moving felt or padded buffer wheel 209, an orienter 210, and a feed tube 211.

A vibrator 213 is attached to the bottom side of trough 208 to provide vibration of the trough to facilitate movement of capsules downward into engagement with buffer wheel 209. Wheel 209 is mounted in trough 208 by means of a spindle or shaft 214. Likewise orienter 210 which comprises a set of parallel sheaves or "V-pulleys" is mounted on a spindle or shaft 215.

Rotary motion is applied to those rotatable elements of the present invention by means of a drive motor 216 coupled through a gear reducer 217 to spindle 206. A top rotary joint 218 is rotatably connected to drive motor 216 through shaft 206 and serves to rotate in a clockwise direction as seen from above. A series of upper weld mandrels 219 are attached to rotary joint 218 by connection means (not illustrated). Weld mandrels 219 are also vertically reciprocal and are positioned vertically by the action of inbound rollers 220 which engage in cam slot 221 formed in a stationary cam wheel 222. The weld mandrel 219 comprises a bearing mounted weld head 223 rotatably mounted on an elongated mandrel shaft 224 which in turn is suspended from a cross-mandrel shaft 225. Cross-mandrel shaft 225 has the aforementioned inboard roller 220 and an outboard roller 230 rotatably mounted at each end thereof. In this particular preferred embodiment there are sixty weld mandrels 219 located radially outward from rotary joint 218 in relative equispaced configuration.

The upper weld assembly, comprising components numbered 204 through 230, are suspended by a main pedestal column 231 centrally located therebelow and extending downward to the lower weld assembly. The lower weld assembly generally comprises a weld wheel 203, a bottom rotary joint 232, a lower shroud 233, a base pedestal 234, and a control console cabinet 235. Control console 235 which supports the entire weld apparatus may be mounted by wheels 236 to provide portability of the system. A control panel 237 is located on the front surface of cabinet 235 to allow establishment of process control variables in the operation of the system.

FIG. 6 is a top view of the apparatus of FIG. 5. The view of FIG. 5 is taken along section A—A of FIG. 6. In FIG. 6 the capsule weld system 201 shows a top dome cover 240 below which is located a series of weld mandrels 219 drawn in phantom to illustrate typical locations below the upper rotary assembly. A drive system 241 is arranged in proximity to weld stations 219 and comprises a driven pulley 242 and a driving pulley 243. A second driven pulley 244 is also located in close proximity thereto. A drive belt 245 is stretched over the three pulleys and also is arranged to engage mandrels 219 along an arcuate section 246. This arcuate section comprises approximately 60 to 70 degrees of the entire 360 degree circular arc of the upper rotary system. The spinner system 241 is shown also in FIG. 5 in partial cross-sectional side view. The drive motor 247 of FIG. 5 serves to drive the driving pulley 243 and to move the drive belt 245 about the three pulleys. A housing 258 protects the spinner drive assembly. FIG. 6 also illustrates the arrangment of a vacuum pump 250 to provide operating vacuum for maintaining the capsules in their orientation in the system. Discharge wheel 204 comprises a circular plate having capsule indentations 251 formed in the outer wall thereof. A water storage tank 253 is provided for storing a supply of distilled water for the welding system. An electrical cabinet 254 is also provided for housing the electrical components of the present system.

Also in FIG. 6 a more detailed construction of the feeding system comprising the conveyor 207, the trough 208, the wheel 209, and the orienter 210 is illustrated. The trough 208 is provided with a series of parallel longitudinal channels 255 cut or formed in the bottom of trough 208. Each channel is arranged to orient the capsules in a longitudinal direction with respect to trough 208. At the end of trough 208 a soft padded buffer wheel 209 rotates to draw the capsules into the orienter 210. The orienter 210 comprises a set of six pulley-like sheaves 256 each having a profile generally illustrated in FIG. 9. In FIG. 9 one of the orienter sheaves 256 is illustrated having a profile of a narrow inner channel 257 and a wider outer channel 258 located radially outward from inner channel 257. The construction or orientation of wheel 256 is such that as the capsules pass over the top of orienter 210 the lower portion of the capsule will pivot inward into the restricted channel 257 forcing the upper capsule section into the upper or top portion 258. This is achieved by making the inner channel 257 smaller than the outer diameter of the capsule top thereby preventing entrance of the capsule top into the lower channel. Thus the combination of channels 255 and sheaves 256 serves to orient the capsules first in a longitudinal direction and then with respect to the large and small ends into a vertical orientation. From sheaves 256 the capsules slide into a series of feed tubes 211, one of each being located directly below the lip of each sheave 256. Each feed tube 211 curves downward into a vertical feeding position directly above a capsule cavity on weld wheel 203 as illustrated in FIG. 5. It should be noted that for purposes of simplicity and clarity a single feed tube 211 is illustrated in FIG. 5 yet in the preferred embodiment a series of six such tubes in fact are used.

Figure 10:
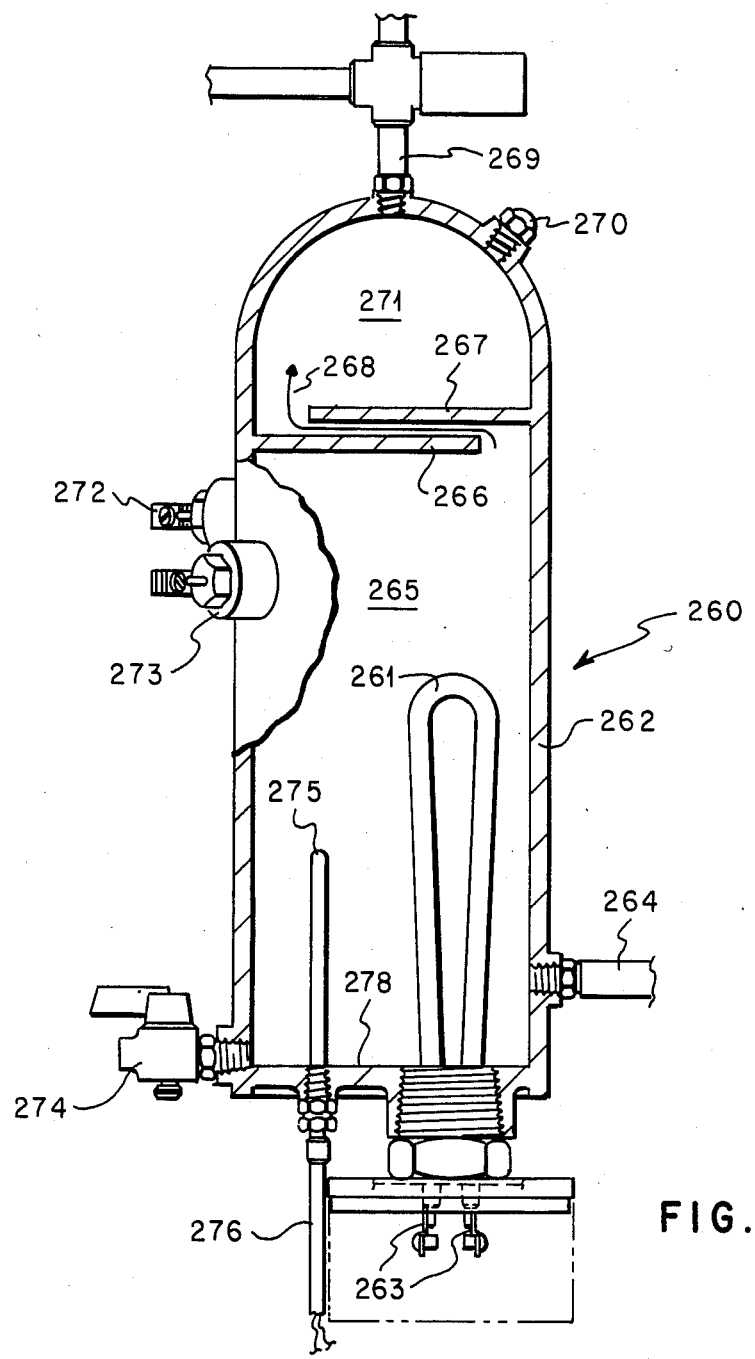
FIG. 10 illustrates a cross-sectional side view of the steam jet assembly of the invention.

In addition to the various aforementioned assemblies and subassemblies illustrated in FIG. 6 associated with the present system, one key subassembly is the process generator 260 located radially inward from weld mandrels 219 across from spinner drive system 241. The process generator 260 is more clearly illustrated in FIG. 10 and comprises a steam jet generator having an electrical flash element 261 located in a tubular housing 262. The flash element 261 is heated by electrical power preferably 220 volts supplied to contacts 263. Element 261 is a resistance heater driven by the 220 volt power source and utilized to flash distilled water which enters through supply line 264 and is maintained in primary fluid compartment 265. A pair of alternating offset baffle plates 266 and 267 are located in tube 262 to prevent liquid water from escaping chamber 265. A narrow escape path indicated by flow arrows 268 is arranged between offsetting plates 266 and 267. Steam is allowed to escape through jet nozzle 269.

A blowout plug 270 is located in the steam compartment 271 of steam generator 260 and is adjusted at around 5 psi to prevent over-pressurization of the generator system. A high level liquid probe 272 is located in the wall of compartment 265 and a low-level probe 273 is located in the lower surface of compartment 265 to indicate a low fluid level. Petcock 274 is also located in the lower end of chamber 265 to allow drainage of fluid from the steam generator for maintenance purposes. A temperature probe 275 projects inwardly into the lower portion of chamber 265 from back wall 278. A temperature control wire 276 leads from temperature probe 275 to the control panel for the system. It should be noted that steam jet 269 is directed at a gelatin capsule in the region of "Z" as illustrated in FIGS. 3 and 4. The position of steam generator 260 is schematically illustrated in FIG. 6, as previously mentioned, radially inward from the weld mandrels 219 and the spinner drive system 241. The steam jet 269 is directed radially outward to impinge capsules held in weld heads 223. Preferably a source of vacuum is supplied down each weld spindle 224 to provide a source of vacuum for head 223 to grasp capsules therein. Likewise a source of vacuum is supplied upward through weld wheel 203 to grasp the capsule bottom sections held therein.

OPERATION OF THE PREFERRED EMBODIMENT

In typical operation the upper rotary joint, which as previously mentioned features sixty welding stations, is driven in a clockwise direction on a continuous motion basis. As the system rotates, prefilled capsules are supplied via chute 207 to orientation trough 208 whereupon the capsules roll into a longitudinal orientation in channels 255. The capsules are then swept by padded buffer wheel 209 into the parallel grooves of sheaves 211 which further orients the capsules in a proper vertical orientation with the large end up and the small end down. The capsules then travel in this orientation across the top of orienter 210 and drop into the six feed tubes 211. The feed tubes supply the properly oriented capsules into six adjacent positions on rotating weld wheel 203 which is also constantly rotating at the same speed as the upper rotary assembly. Thus lower rotary weld wheel 203 is likewise moving in a clockwise direction when viewed from above. The capsules which are then gripped in capsule recesses 280 formed in weld wheel 203 travel with the weld wheel around the circumference to a point near the bottom of FIG. 6. Referring to FIG. 5 it can be seen that cam slot 221 moves from an uppermost point at the right side cam wheel 222 to a lowermost point near the center thereof. In effect this serves to lower the weld mandrels 219 which are traveling in cam slot 221. Thus as the capsules and weld mandrels approach this lowermost point of FIG. 6, mandrels 219 move down over and into engagement on the tops of the capsules in weld wheel 203. As the weld mandrels 219 are lowered down onto the tops of the capsules by means of engagement in cam slot 221, vacuum is simultaneously applied to the weld head 223 to grasp the top half 102 of capsule 101. At this point roller 220 has reached the lowermost travel point 280 of cam wheel 222. A short time thereafter, covering approximately 10 to 15 degrees of arc on wheel 222, the cam slot 221 rises a distance equivalent to the displacement "Z" illustrated in FIGS. 3 and 4 and shown in FIG. 5 at 281. This serves to displace capsule top 102 upward an amount Z off of bottom 103. The weld mandrel then travels through slot portion 281 with the capsule thus displaced, around the lower left quarter of wheel 203 as illustrated in FIG. 6. During this portion of travel the weld mandrels engage spinner drive belt 245 which is continuously moving under the force of driving wheel 243. The speed of rotation is in the range of 100 to 300 rpm and the mandrels 223 are rotated on spindles 219 and obtain this speed fairly rapidly. As the capsules progress around the arc by movement of wheel 203, they come into the vicinity of process generator 260 which emits a jet of steam approximately 1 to 3 thousandths of an inch in diameter which impinges lower the capsule in the region Z as indicated in FIG. 3. If desirable, using the alternate embodiment of FIG. 7, the bottom capsule half can be rotated at about 100 to 300 RPM during steam impingement so that the steam jet will impinge the periphery of capsule bottom 102 several revolutions in the zone Z. This will tackify the gelatin in this region. Otherwise, when not using the embodiment of FIG. 7, the steam will wrap substantially around the periphery of the lower capsule half, and the spinning of the capsule top half, as described below, will even-out and homogenize the tackification. The alternate embodiment of FIG. 7 consists of a rotatable lower mandrel 229 mounted in a bearing 227 and having an input drive shaft 228.

As the capsules move past the process generator in response to wheel movement 203, the cam slot 221 will move once again from the intermediate level 281 back to the lower level 280 as the capsules are spinning. This moves the top section back down over the bottom section in each capsule until it is returned to the orientation illustrated in FIG. 4. Because of the steam impingement on the lower section of the gelatin capsule and the resulting tackification of the gelatin, the spinning of the top onto the tackified surface results in a smooth, even fusion of the two gelatin capsule portions.

The spinning is then stopped and the capsules progress around the cycle until they engage discharge wheel 204 and are gripped by suction in one of the indentations 251 therein. This wheel is moving in a counter clockwise direction and preferably moves the capsules past an inspection station 290 which may comprise one or more of several different types of inspections, including: but not limited to, visual inspection, infrared inspection, x-ray inspection, sonic inspection, and other known types to determine the integrity of the fusion bond between the two capsule portions. After inspection, the capsules reach the discharge area 291 whereupon vacuum in wheel 204 rapidly converts to air pressure and the capsule is ejected into a conventional conveyor system which then moves the capsule into the packaging and/or bottling area of the manufacturing plant.

Thus in summary, the capsules are fed through the following process steps:
A. Feed and orientation;
B. Location into the weld wheel;
C. Partial separation of the capsule components;
D. Spinning of the upper portion of the capsule on the lower portion;
E. Tackification of the lower portion by impingement of a steam jet;
F. Rejoining of the capsule sections during spinning operation;
H. Take-up of the capsule in the discharge wheel;

I. Visual inspection of the fusion bond in the capsule;

J. Discharge of the capsule into the normal bottling operation;

It is felt that the combination of the tackifying process utilizing the thin stream, low pressure steam jet, plus the spinning action of the weld mandrel serves to both create a good fusion medium plus also serves to homogenize and spread the tacky substance into a homogeneous consistent bond between the upper and lower capsule components. It should also be noted that the precise yet high speed operation of the present system prevents any contamination of the capsules while also allowing a very rapid, economical fusion process to be accomplished. The lack of contamination is achieved by maintaining the capsules in an engaged position at all times during the operation and never permitting any contact of the capsule contents with the outside atmosphere, or with any part of the welding apparatus. Such precise control is obtained by the exact and precise machining of cam slot 221 in the cam wheel and by the lack of any appreciable tolerances or play in all of the rotating elements of the present system. Thus with the present system, it is contemplated that approximately 120,000 capsules per hour can easily be fused in this system with just a minimum amount of energy expenditure.

Although a specific preferred embodiment of the present invention has been described in the detailed description above, the description is not intended to limit the invention to the particular forms or embodiments disclosed therein since they are to be recognized as illustrative rather than restrictive and it will be obvious to those skilled in the art that the invention is not so limited. For example, whereas one particular type of feed system and orienter is disclosed it is obvious that other types of feed conveyors and orienters could be utilized using systems such as air, vacuum, sensing wires, and other such apparatus. Also whereas the present invention is shown as operating at the end of a capsule filling line this system could be integrated into the capsule filling line.

It should also be noted that whereas the present invention has been disclosed with reference to rigid gelatin capsules a more generic definition of rigid gelatin is that it is a thermoplastic material and the methods and apparatus of the present invention can be easily adapted to the fusion of telescopic capsules formed of other types of thermoplastic materials. For example, these methods and apparatus can be utilized to fuse thermoplastic polymers rather than rigid gelatin capsules. It should also be noted that other means for tackifying the telescopic area between the capsule halves can be utilized other than the steam generator means shown herein. For example, one could utilize a spray of a solvent for the thermoplastic material to tackify the telescopic areas. For example, when fusing capsule halves of a thermoplastic polymer a hydrocarbon solvent for the polymer could be utilized. Also in the fusion of gelatin capsules a solvent comprising a solution of the gelatin in water or other gelatin solvent can be used as the tackifying agent. In such an instance the steam generator illustrated herein can be replaced with a solvent emittor utilizing either high pressure or vacuum emission principles. It is foreseen that the gelating utilized in the capsules can also be utilized in the solvent emittor by disolving such gelatin in any of its available solvents. In one embodiment it is foreseen that the gelatin can be disolved in a sterilized water to form the tackifying surface between the capsule havles. Sterilized water is preferred to maintain the integrity of any consumer product located inside the the capsule.

Other means for tackifying the telescopic area between the capsule halves include placing heating means in close proximity to each of the capsule halves and heating the local perpherial area therebetween. Such heating means include electrical resistance heaters, radiant heaters, laser heaters, conductance heaters, plasma jets, ultrasonic generators, radio-frequency heaters, microwave generators, and flame heaters. Other equivalent heating means known to those skilled in the art likewise could be substituted for the tackifying means disclosed herein above.

Additional means of homogenizing the tackified surfaces between the capsule halves includes, in addition to the aforementioned rotational homogenizing step, the step of homogenizing by axially oscillation of the capsule halves together in their telescopic state. Oscillations in the range of from about 20 to about 20,000 cycles per second can be utilized for said homogenizing step. This compares favorably to the aforementioned rotational homogenizing which preferrably ocurrs at a rate of from about 20 revolutions per minute to about 2,000 revolutions per minute. Thus the invention is declared to cover all changes and modifications of the specific example of the invention herein disclosed for purposes of illustration, which do not constitute departures from the spirit and scope of the invention.

The embodiments of the invention in which an exclusive property or privilege is claimed are defined as follows:

1. A method of forming tamper-resistant, tamper-indictive rigid gelatin capsules containing consumable products, said method comprising:
   locating said consumable products in telescoping rigid gelatin capsule pairs;
   partially telescopically engaging the capsules of said capsule pairs;
   tackifying at least a portion of the remaining telescoping area of each said capsule pair;
   fully engaging said capsules in each said capsule pair; and,
   simultaneously rotating at least one of said capsules in said pair to homogenize the tackification area therein.

2. The method of claim 1 wherein said rotating step comprises rotating at least one of said capsules in each said capsule pair until each said capsule pair is fused together.

3. The method of claim 1 wherein said tackifying step comprises circumferentially impinging the external telescopic area of at least one capsule of a capsule pair with a jet of steam.

4. The method of claim 3 wherein said circumferential impinging step comprises impinging the telescopic area of the inside capsule with a thin line-jet of steam while rotating said inside capsule at least about 360 degrees.

5. A method of securely joining together the two telescopic capsules of a rigid gelatin capsule pair, said method comprising:
   feeding telescoped capsule pairs into an orienter;
   orienting said capusles pairs longitudinally and end-for-end;
   locating said pairs into a rotating wheel so that the larger, outside capsule of each pair points upward;
   gripping the upper and lower capsule sections and partially detelescoping them;

impinging a fusion stream circumferentially on the telescopic zone of said capsules; and, rotating said capsule sections while fully reengaging them telescopically to homogeneously seal the capsule pair.

6. The method of claim 5 wherein said fusion stream comprises steam.

7. The method of claim 5 wherein said fusion stream comprises a line-jet of steam administered to said capsule while said capsule is rotated at least about 360 degrees.

8. The method of claim 5 wherein said fusion stream comprises an atomized stream of a gelatin solution.

9. The method of claim 8 wherein said gelatin solution comprises gelatin and water at a temperature of from about 80° F. to about 200° F.

10. A method of forming pairs of rigid thermoplastic capsule halves into fused tamper-resistant, tamper-indicative capsules, said method comprising:

selecting upper and lower capsule halves that are adapted for snug-fitting telescopic engagement with each other;

placing in the inner one of said halves a desirable product;

partially telescoping the outer half over the inner half;

tackifying the remaining untelescoped exterior area of said inner half; and, completely telescoping said halves together while homogenizing the tackified material therebetween.

11. The method of claim 10 wherein said homogenizing step comprises rotating at least one of said halves with respect to the other half while performing said complete telescoping step.

12. The method of claim 10 wherein said homogenizing step comprises axially oscillating at least one of said halves with respect to the other after said tackifying step.

13. The method of claim 11 wherein said thermoplastic capsules are formed of a rigid gelatin and said tackifying step comprises spraying at least one of said capsule halves with a tackifying stream.

14. The method of claim 13 wherein said tackifying stream comprises steam.

15. The method of claim 13 wherein said tackifying stream comprises a gelatin solution.

16. The method of claim 12 wherein said thermoplastic capsules are formed of a rigid gelatin and said tackifying step comprises spraying at least one of said capsule halves with a tackifying stream.

17. The method of claim 10 wherein said tackifying step comprises locally heating at least a portion of said untelescoped area of at least one of said halves.

18. The method of claim 17 wherein said heating step comprises heating in a localized peripheral area by heating means selected from the group comprising electrical resistance heaters, radiant heaters, laser heaters, conductance heaters, plasma jets, ultrasonic generators, radio-frequency heaters, microwave generators, and flame heaters.

19. The method of claim 10 wherein said tackifying step comprises impinging said area with a solvent stream comprising a jet of fluid solvent for said thermoplastic material.

* * * * *